United States Patent Office 3,350,761
Patented Nov. 7, 1967

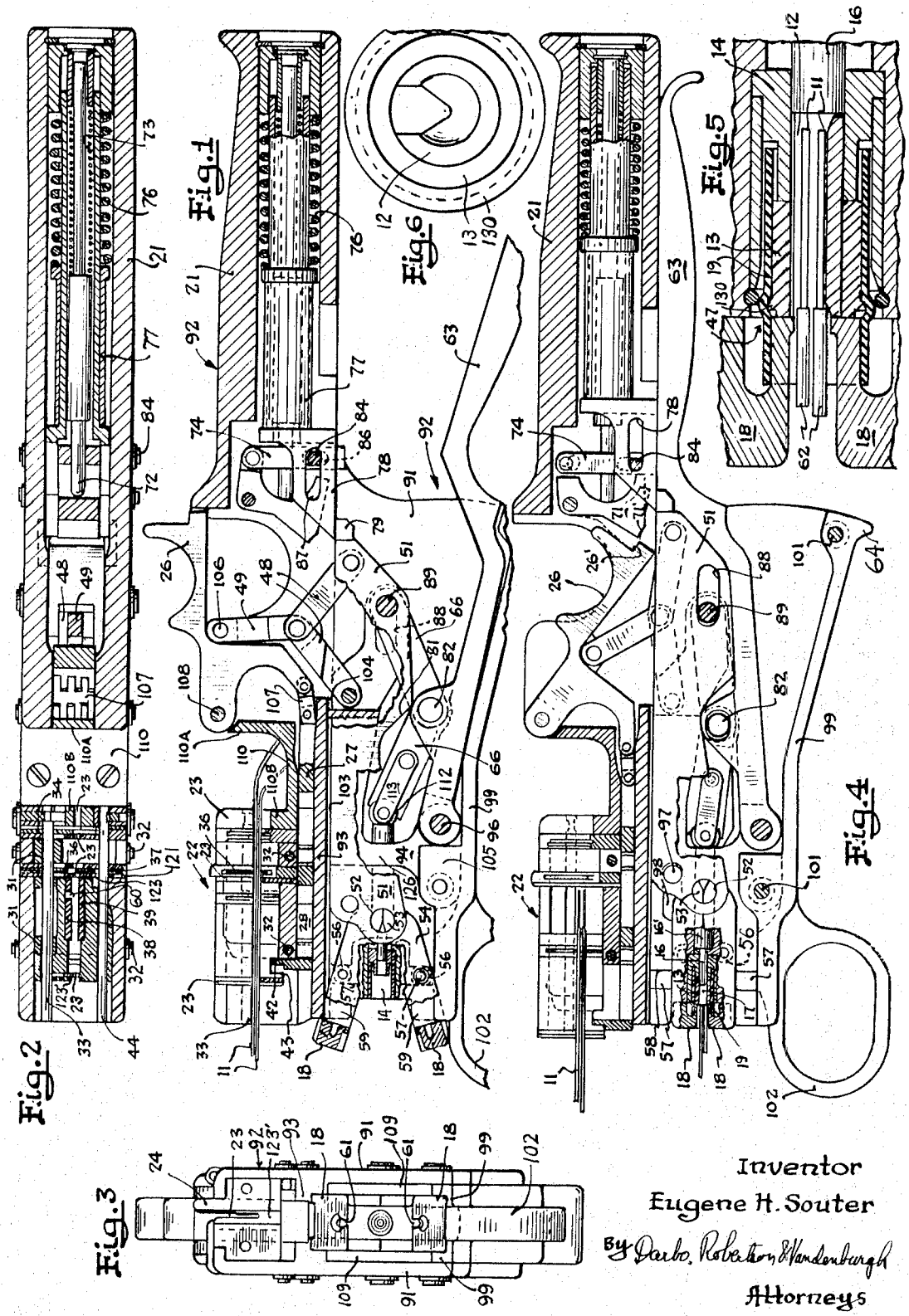

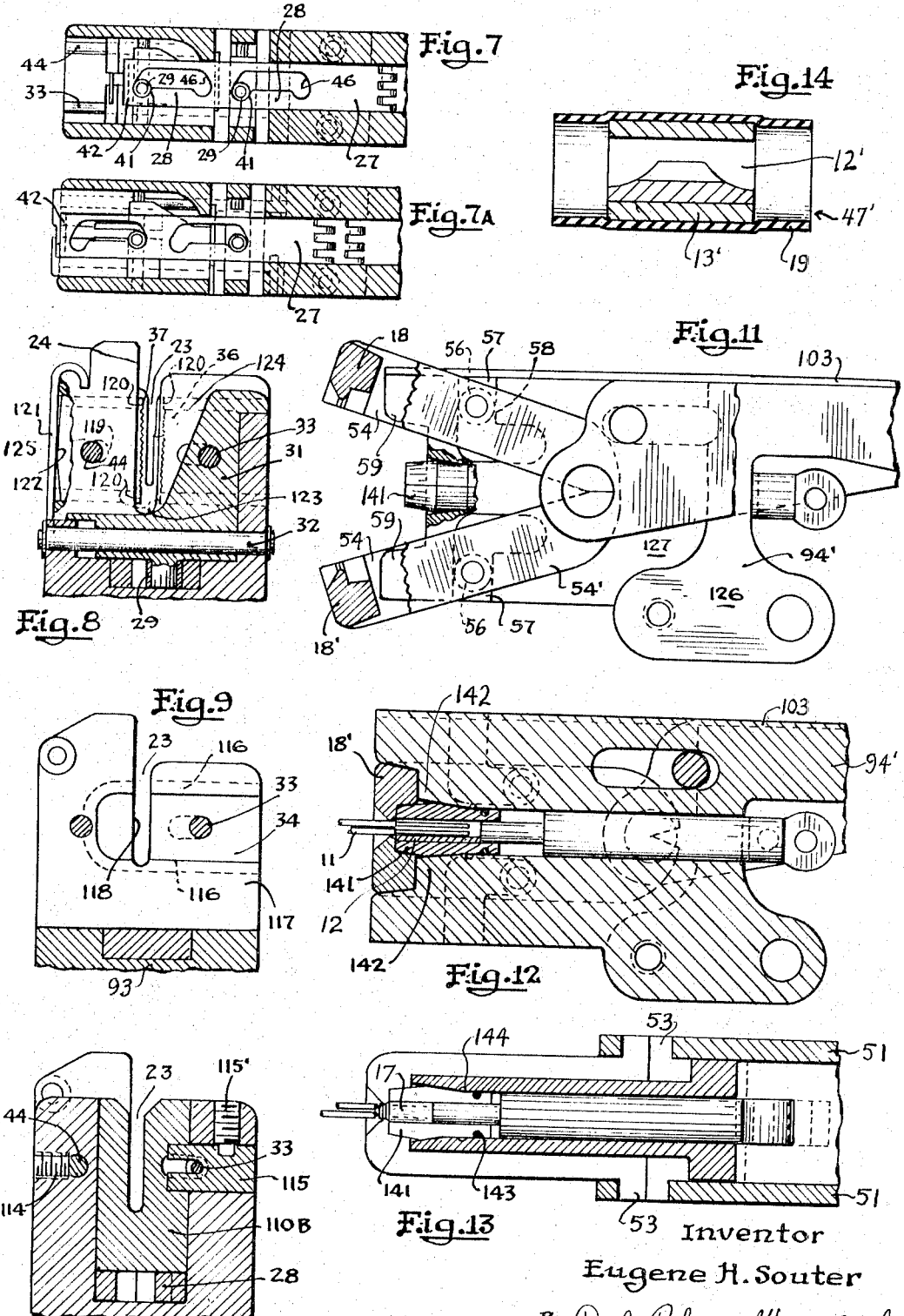

3,350,761
COLD-FLOW SPLICES AND TOOLS THEREFOR
Eugene H. Souter, 721 Simpson St.,
Evanston, Ill. 60201
Filed May 13, 1965, Ser. No. 455,544
27 Claims. (Cl. 29—34)

This application relates to the making of permanent wire connections without solder and is especially suitable for telephone cable conductors. This disclosure is offered for public dissemination in the event of the grant of adequate patent protection.

The problem of splicing telephone cables has long been of tremendous and increasing economic and technical importance due to increased labor costs and more critical requirements of modern telephone circuitry. At the end of every length of cable, every wire in the cable (often thousands of pairs) must be spliced to a wire in the next length of cable, the splice must be insulated from other splices, and the entire bundle of splices must be sealed in a waterproof sheathing. For many years, there were two standard methods of splicing. One was to twist the stripped ends of the two or more wires to be joined and solder the twisted splice. Such splices, due to soldering variables, do not always provide minimum resistance for the desired period of time, but since this has proved to be the most dependable method of splicing, its use has been employed in joining all long distance and certain other most critical cable conductors.

Because of the high cost of making such splices the conductors in subscriber telephone circuits are made without soldering but, usually, by simply twisting the wires together. In recent years, a great deal of time and money has been expended in an effort to develop a mechanically produced splice as reliable as the soldered splice but at a cost less than that of a simple twisted splice. At least one such splice was widely proclaimed as solving the problem only to be given up because a high percentage of splices so produced provided to be "open," or to high resistance either at the time they were made or soon thereafter. Another mechanically made splice is being used to a limited extent at the present time, but it is more expensive than even the soldered splice, and in addition, its continued reliability is questionable. Furthermore, it is relatively bulky, so that when the necessary thousands of splices at a cable splicing location have been made, the necessary sleeve for enclosing them is objectionably large, resulting in high labor and materials costs, and greater space requirements.

According to the present invention, splices are formed by an upsetting or cold-flowing operation which virtually coins together the splicing metal and the wires, the result being that splices thus produced are at least equal to the best soldered connections for all conditions and superior as to some; and a tool for making such splices is provided which enables an unskilled worker to make these splices with greater dependability than even a skilled worker could achieve making soldered splices. The preferred form of the tool also cuts and strips the wires to be joined. The tool is small, light weight and easily handled. FIGURES 1, 2, 3 and 4 are actual size, as filed, four-fifths size as printed in the patent.

Additional objects and advantages of the invention will be apparent from the following description and from the drawings.

Designation of figures

FIGURE 1 is a longitudinal sectional view of the splicing tool chosen for illustration of the present invention, some parts being broken away for clarity.

FIGURE 2 is a longitudinal sectional view taken approximately at right angles to FIGURE 1, showing especially the wire shearing and stripping mechanism and the spring mechanism.

FIGURE 3 is an end view of the structure shown in FIGURE 1.

FIGURE 4 is a view similar to FIGURE 1 but showing the tool in its fully actuated position with a completed splice therein.

FIGURE 5 is an enlarged view showing the wires inserted into the splicing core before the upsetting operation.

FIGURE 6 is an end view of the splicing sleeve and core.

FIGURES 7 and 7A are sectional views of the wire clipper and stripper, looking upwardly at the cam, and respectively showing starting and final actuated positions.

FIGURE 8 is a fragmentary sectional view taken through the shuttle carriage of the shearer and stripper, looking through one of the insertion guides toward the stripper assembly and the forward insertion guide.

FIGURE 9 is a similar view showing the face of the clipper assembly.

FIGURE 10 is a similar view showing another insertion guide and the locking means for the slide rods.

FIGURE 11 is a fragmentary longitudinal view of some of the internal parts of a modified form of the tool needing no splicing sleeve, partly broken away to an axial section.

FIGURE 12 is a sectional view of the structure of FIGURE 11 in closed position, and nearly all on the axial vertical plane, showing the wires 11 and core 12 inserted.

FIGURE 13 is a view of the structure shown in FIGURE 12 taken mainly on the horizontal axial plane showing ram 16 fully actuated.

FIGURE 14 is an enlarged axial sectional view showing a form of splicing core-sleeve-pod assembly now preferred.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

General description of splice

According to the present invention the splice is made (see FIGURE 5) by inserting the stripped ends of the wires 11 to be joined into a slotted core 12 of annealed copper, which is surrounded by a sleeve 13 (or, in FIGURE 12 is surrounded by a die 141), and upsetting the core 12 by the thrust of a plunger 16. This causes a cold flow of the metal of core 12 around the wires 11 into one intimate "coined" splice 17 seen at approximately its actual size in FIGURE 4. Jaws 18 bear on the ends of core 12 and sleeve 13 to withstand the thrust of plunger 16.

General description of tool and its operation

In using the tool it will usually be held in one hand, perhaps continuously (the right hand if the operator is right-handed). First the splicing assembly or unit 47 will be inserted. In the form of invention shown in FIGS. 1 to 10 this, as seen best in FIG. 5, includes a core 12, sleeve 13, and surrounding insulating sleeve or pod 19. This unit will be inserted into the die or fabricating cavity seen in FIG. 1. Then the two or three wires to be joined will be held side by side extending from the hand not holding the tool and slipped downwardly in guide slots 23. Then lever 26 is operated by the thumb of the hand holding the tool. This moves various parts to shear the wires to proper length and suitably strip insulation from the ends of sheared wires and close jaws 18. The completion of the stroke of thumb lever 26 releases these wires; and the operator, who will not have released them from his hand, removes them from the shear strip assembly and inserts their stripped ends end-first through jaws 18 which guide them into core 12. Now the operator squeezes hand or grip lever 63 and forces plunger 16 to its fully actuated position finishing with intense p.s.i. of force to thereby coin or cold-flow core 12 around the wires and form a coined splice of permanent lowest possible resistance. The confined cold flow apparently ensures either clean metal contact with the wires or such a large area of intimate and nearly clean contact as to be the equivalent. The pressure stretches sleeve 13, which probably remains in an elastically stretched condition.

General description of shearing and stripping

Assuming that the parts of the tool are in the starting position as shown in FIG. 1, the operator holds the tool naturally just to the rear of its mid-section with his operating hand and, with the other hand, inserts the two or three wires 11 to be spliced into the clipper and stripper unit 22 as seen in FIGURE 1. A plurality of guide slots 23 are provided, of which the forward one is seen in FIGURE 3. Two are seen in FIG. 8, one behind the other. Preferably one side of each guide slot 23 is extended to a projecting finger or guide 24 so that the wires may be moved against this finger and easily slid down into the slot. The operator then presses thumb lever 26 which actuates a cam slide 27 having a cam portion 28. As may be seen best in FIGS. 7 and 7A, cam 28 actuates cam rollers 29 laterally. As seen best in FIG. 8, each cam roller is carried by a shuttle frame 31, so that this shuttle-frame slides laterally on fixed rods 32. Shuttle frames 31 carry an actuating rod 33 which actuates a knife blade 34 to clip the free ends off of the wires so that they will have a uniform and required length. Usually there is considerable unneeded length to be cut off. Rod 33 also moves a toothed stripper blade 36 toward a relatively stationary stripper blade 37 to pierce and partially sever the insulation on the wire, regardless of whether it is pulp, paper, plastic, or some other type. Rod 33 also moves a wire-gripping panel 38 toward a then stationary wire-gripping clamp or panel 39 to grip the wires firmly. All of this is accomplished while the slide 27 moves only the short distance required to move the riser portions 41 of the cam 28 beyond the center lines of the rollers 29. At this time, the ledge or bumper 42 carried at the end of slide 27 engages shoulders 43 on the gripper plates 38 and 39 and slides the gripper forwardly. Thus gripper 38 slides along rod 33 and gripper 39 slides along rod 44. This moves the wires far enough to strip the ends of the insulation from the wires. In other words, it draws the clipped ends of the wires forwardly through the stripper members 36 and 37.

At this time, riser portions 46 of cam 28 encounter cam follower rollers 29 and thrust them laterally back substantially to their starting positions, thus opening the gripper 38, 39 and releasing the wires which have been stripped.

The operator will normally have retained his hold on the wires and will now insert them in the splicing unit 47.

General description of splicing unit

At the same time that the thumb lever 26 was operating the stripper unit, it also actuated toggle links 48 by means of connecting or toggle-thrust link 49, to move rearwardly a pair of jaw closing slides 51. FIGURE 1 shows the starting position of toggle links 48 and slides 51 (with the near slide 51 partly broken away) and FIGURE 4 shows the terminal position of these parts. Each of slides 51 has at its forward end a hole 52. These holes engage segmental lugs 53 on jaw forks 54, so that when slide 51 is drawn rearwardly the jaw forks 54 are also drawn rearwardly. Each jaw fork 54 carries on each leg a jaw-closing roller 56 mounted on a pintle permanently fixed in jaw fork 54. As seen in FIGURE 1 and more clearly in FIGURE 11 the rollers 56 are initially in vertical slots 57 (in opposite faces of the front end of center frame 94), these slots are seen partially in full lines in FIGURE 4. During the initial rearward movement of the jaw levers or forks 54, slot walls 58 act as cams bearing on rollers 56, and moving these rollers toward one another to close the forks 54 thus closing the jaws 18 together. The subsequent rearward movement of the slides 51 will draw the jaws 18 rearwardly so that the inward and concentric projections on the jaws will slip inside insulation pod 19 and into engagement with core 12 and sleeve 13, which assembly was previously inserted as seen in FIG. 5. As jaws 18 are drawn rearwardly, they are pulled between shoulders or nose pieces 59 forming the end of center frame 94. This locks the jaws 18 in very close relationship for withstanding the great expansive force exerted by the metal which tends to flow between them during the cold flowing operation.

It is at this stage in the operation of the splicer that the grippers 38 and 39 are separated, releasing the wires; and the operator immediately inserts them through the axial guide opening formed by jaws 18 (the two halves 61 of this opening being seen in FIGURE 3). The operator thrusts the wires "home," which could be when their ends strike plunger 16, but has been shown (FIG. 5) as when the insulation 62 on the wires strikes core 12. Preferably provision is made for positive visual inspection, by placing kinks in the wires at such a position that they will lie flush with face of jaws 18 if the wires are "home." These kinks are made by vertical metal rib 60 projecting through the face of clamp 38, acting to depress the resilient face in clamp 39.

Up to this time the operator will have avoided pressing grip lever 63, as by keeping his index finger in front of lug 64. The operator now squeezes lever 63, perhaps first shifting his operating hand to the rear-most position on the tool. He moves grip lever 63 from the position shown in FIGURE 1 to the position shown in FIGURE 4. This operates toggle links 66 to thrust plunger 16, 16′ forwardly, coining core 12 about wires 11 by cold-flow of the metal as previously described. The progressively increasing mechanical advantage such as that of a toggle linkage is very important in obtaining the needed ultimate force without too long a stroke for grip operation.

Abortion prevention

To ensure 100% dependable splices, it is important that hand lever 63 be operated through its entire stroke. To this end the tool is so made that the splice cannot be removed until this has been accomplished.

As thumb lever 26 reaches the end of its movement, at which time slide 51 and jaws 18 reach their rear-most position, latch lever 71 springs from the full line position shown in FIGURE 4 to the dotted line position shown in FIGURE 4, in which the latch edge 71′ locks a lug 26′ on thumb lever 26. Latch lever 71 is urged to this position by pin 72 which in turn is biased by spring 73, the inner of two springs within main handle 21. This locks the jaws 18 in the position shown in FIGURE 4 until latch 71 is released. Latch 71 is not released, however, until hand lever 63, at the end of its stroke, thrusts release link 74 upwardly. By virtue of the fact that link 74 is pivoted to a rearward arm of a bell crank lever 71, this swings latch 71′ back to the full line position of FIGURE 4, releasing thumb lever 26 and allowing it to return to its starting position shown in FIGURE 1.

At this time, all parts are moved to their starting or FIGURE 1 position by return spring 76 located within handle 21. Return spring 76 thrusts sleeve 77 forwardly and it in turn thrusts forwardly pusher foot 78, the toes 79 of which thrusts slides 51 forwardly, returning jaws 18 to their FIG. 1 position. Slides 51 have a cam surface 81 positioned to bear upon an upward projection of hand lever 63 and force toggle pin 82 downwardly thereby restoring lever 63 and associated toggles 66 to the FIGURE 1 position and retracting plunger 16, 16'. Thus the splicing tool is ready for reloading and for a new splicing operation.

*Further details of splicer*

A pin 84 serves as a guide for both the pusher foot 78 and link 74. Link 74 is provided with a vertical slot 86 through which pin 84 extends. Pusher foot 78 is provided with a horizontal slot 87 (or really two such slots since foot 78 straddles link 74, and both forks have a slot 87).

The rear ends of slide 51 have slots 88 which ride on pin 89 secured in side walls 91 of main frame 92. Main frame 92 is an H frame, having a transverse member or integral cross plate 93, which carries cam slide 27. Main handle 21 also joins the side walls 91.

Pin 89 performs an additional function. It holds the rear end of center frame 94. Pin 96 also cooperates in holding front end of center frame 94, and in addition pivots hand lever 63. Pin 96 extends through walls 91. The shape of center frame 94 can be seen better in FIG. 11, although it is there numbered 94' because its front end is a little different. The rearward surfaces 126 define a thickness suitable for lying between slides 51. Surfaces 127 define a narrower thickness suitable for jaw forks 54 (or, in FIG. 11, 54').

The forward ends of slides 51 carry a pin 97 which ride in a slot 98 in center frame 94. Bottom closure 99 is secured by screws 101. It may carry a ring 102 by which the tool may be hung when operator needs both hands free. Operators may also find it convenient to slip the little finger of the wire-holding hand through this ring, on occassion.

Center frame 94, or a spline 103 thereon, preferably fits into a milled slot 104 in cross plate 93 thereby holding center frame 94 firmly centered at its top. This center frame is held centered at its bottom by being fitted into a milled slot in portion 105 of cover plate 99, this in turn being held securely between legs or walls 91 of the H frame by screws 101. Each of these screws extends through one wall 91 and one of the upward projections 105 of cover plate 99, and is threaded into center frame 94. Central location of center frame is important to insure free movement of jaws 54, slide links 51 and grip lever 63. Before insertion in the H frame 92, center frame 94 is used for pre-assembling a unitary sub-assembly consisting principally of sub-assembly frame 94, jaw and forks 18, 54 with their rollers 56, slide links 51, toggles 66, toggles 48, ram 16, 16', link 49 and hand lever 63. All designated components of this sub-assembly are placed together and the short pins which interconnect these parts are inserted. The sub-assembly is then slid upwardly into the lower channel of the H frame or housing 92. Center frame 94 is slid to its final position and pins 89 and 96 are inserted to hold it there. A sub-assembly consisting of thumb lever 26, slide 27, and connecting link 107 may now, if not previously, be inserted; but not pin 108. Thumb lever 26 and link 49 are worked back until link 49 is positioned about 10 degrees to the right of vertical to expose its top for coupling with lever 26 by inserting a short pin. Pin or screw 108 for the thumb lever 26 can be inserted last in this part of the assembly.

End closure plates 109 (FIG. 3) are permanently assembled with main frame 92 by riveting. Portions 110, 110A and 110B (see FIGS. 1, 2 and 10) of the housing, immediately over cam plate 27 comprise one piece which is removable, and secured by screws (FIG. 2) to the main frame 92.

Because of the great force exerted on plunger shank 16' by toggle links 66 in order to cause cold-flow of the core 12, this force preferably is not transmitted through a pin. The rear end of plunger 16 is provided with a part-cylindrically-shaped knob 112, and forward link 66 is correspondingly shaped to fit it. Plunger 16, is drawn rearwardly by tie links 113 secured to knob 112 by a pin, and to opposite sides of link 66 by a rivet; the tie links 113 preferably resting in grooves in link 66.

The various short pins mentioned are held in place by the walls 91 of H frame 92. Most of the pins shown in cross-section extend through the walls 91 and are secured by snap rings in slots, around and near the end of the pins.

*Further details of clipper-stripper*

Shearing blade 34 slides in vertically open horizontally extending grooves 116 (FIG. 9) in cutting plate 117 which provides a shear face 118 which cooperates with blade 34 to clip the wires when actuator rod 33 is shifted to the left.

Stripping blades 36 and 37 slide in grooves of similar shape, in a single vertical plane. The grooves on each side of the wire-receiving gap are milled in stripper guide 24 in a single pass. Thus there is no shearing action. Both stripper plates have sharpened teeth and when they come together the tips of all teeth lie in a common plane, together with buttresses 120 at each end. Rod 33 has enough movement to be sure to bring them together. Blade 37 is provided with slot 119 so that it can move horizontally. However, it is tensioned, or preloaded, by spring 121, which engages blade 37 only at a mid-point 122. With plates 36 and 37 closed, the geometry is that openings between plates (which openings may be rectangular) are formed just a few thousandths of an inch larger than is required for the wires but small enough to sever the major portion of insulation and make stripping easy.

The two forward guide slots 23 are formed in gauge separators 123, 123'. Thus, as seen in FIG. 8 the guide slot 23 is wider above an intermediate height than below. The gauge plates thus act to allow finer wires to pass to its bottom, while holding heavier wires above the constriction point 124. The stripper plates 36 and 37 are correspondingly suited for coarser wire on their upper half and for fine wires on their lower half. For example, the teeth having a 90 degree included throat between them may be spaced on centers of .036 inch on the upper half, and .028 inch on the lower half and have a depth sufficient to leave a .003 inch vertical face at the tip of each tooth. These dimensions are for wire sizes 24 and 26 gauge.

If three-wire sizes are to be used, another constrictor and another tooth spacing could be provided.

Stripping plate 36 and stripping plate 37 are ground on one side at about 60 degree angle to form the teeth. Semi-circular tooth gaps could be ground but it is sufficient to grind 90 degrees included notches. The points shoulded be of closely controlled dimensions on both plates, and so positioned on these plates as to accurately register point-to-point with each other.

The spring 121 should have a preloading strength sufficient to reliably cut the insulation as stripper blades 36 and 37 come together. Only the light pressure of insulation as wires shift to throat centers while plates are being closed is ever applied to points of notches. Stops in the form of flatfaces 120 above and below the sharpened notches on both plates 36 and 37 are protecting the points of teeth, especially since the force applied to stripper plates 36 and 37 can never be greater than the resistance of spring 121. The precision requirements for shearing the insulation on very small copper wires and stripping it off without damaging the wires has thus been accomplished in a practical manner.

Guide rods 33 and 44 are secured in place as seen in FIG. 10. A simple set screw 114 is enough for stationary rod 44. So that actuating guide rod 33 may move transversely, it is retained by a noncylindrical forked locking plug 115 which is, in turn held with setscrew 115'.

*Further details of splice unit*

The splice unit shown in FIG. 5 is believed to be sufficiently clear from that figure and FIG. 6. Axial rib 130, which may be formed by swedging axially, prevents inserting the splicing assembly wrong end first and holds the sleeve 13 from sliding lengthwise in pod 19. A later form, now preferred, is shown in FIG. 14 and described below.

*Modifications*

The modification shown in FIGS. 11, 12 and 13 is suitable for splicing without sleeve 13 or insulator pod 19. Here the splicing unit is core 12 alone. Since it is a core only with respect to die 141, it could also in all instances be called a blank. By either name, it is a slim piece of metal having a wire receiving recess therein.

As seen best in FIG. 12, core or blank 12 is slipped into a split die 141. While this loaded die is, by jaws 18', held firmly in place wedged in nose 142 of center frame 94', and also wedged in jaws 18', to hold its halves tightly together, the wires 11 are inserted and hand lever 63 is operated to thrust plunger 16 forwardly. This upsets or coins core or blank 12 completing the splice, and then opens jaws 18' to the position shown in FIGS. 1, 3, 4 and 11. If the splice does not come free from die 141 easily, a light pull on the wires will draw die 141 forwardly until it is free to expand enough to release the completed splice. Snap ring 143 will lodge in groove 144 and limit the outward movement of die 141. After it has been loaded again, jaws 18' will press the die 141 back into its tightened position.

*Preferred symmetrical splicing unit*

FIG. 14 shows the form of splicing now preferred. Its differences, and reasons for their preference are:

(1) It is symmetrical end-for-end. The time for chucking assembly 47' greatly is reduced. Since both ends of assembly 47' are identical either one may be entered first into the chucking cavity to thus obviate the necessity of tedious and time consuming orientation before insertion by operator.

(2) The core 12' is of the same length as sleeve 13. Because it does not project beyond the rear end of sleeve 13, there is no necessity for operator to center it with, and push it into ram guide as shown in FIG. 5.

(3) The core is shorter and has less air space within it. Hence, less work in gripping by the hand (fewer foot pounds) is required to cold flow and coin core 12'. This is true because when the void created by the wire receiving slot is reduced, the ram travel required to fill the slot is relatively reduced.

(4) Core 12' is milled at both ends to deepen the wire receiving groove to be sure the wires when guided by the jaws 18' will slip easily into the groove. The guide aperture of jaws 18' is round and concentric with the axis of the splicing unit. Hence, the splicing unit may be inserted without paying any attention to the angular disposition of the groove in core 12' about the axis. Also, manufacturing cost is low. It is expected that long, continuously fabricated lengths of grooved copper wire (the grooves perhaps being rolled or milled) will be milled one core length rearwardly from the end for deepening beyond the groove, and then sawed or cut in the middle of the milled area, thus forming the milled and completed rear end of one core and leaving a milled and completed front end of the next core.

(5) Sleeve 13' is merely square cut, and hence can be sawed at very low cost from copper tubing. The pod 19 is slightly undersize, compared to the diameter of sleeve 13' so that its stretched condition holds it safely on the sleeve 13', without forming any flange or rib 130 on the sleeve, such as that shown in FIG. 5.

The spacing between the shearing and stripping units should be reduced almost to the length of core 12' so that no stripped wire will extend close to the end of pod 19.

*Accomplishment*

Splices made according to the present invention, having been subjected to Dry Ice and then heated to cherry red, have been found to still have substantially "0" splice resistance. Using a measuring technique that can measure to a 100,000th of an ohm, insignificant variations can be detected between samples. However, differences between two spliced wires and equivalent lengths of wires without a splice appear to be due to diameter variations within commercial tolerance of the wires themselves, rather than to any detectable splice resistance.

With the tool of this invention such high quality splices can be made dependably and rapidly without power (except hand power) or heat, and without requiring the skill necessary for soldering with hope of dependability. Also, much less cost for splicing units and less room for the finished splice is required than by the mechanical splicing used or tried to some extent on telephone cables in the last few years. Also, splicing according to the present invention is much less costly than conventional twisting, or twisting and soldering. In all, a great deal of money can be saved by telephone companies, with complete dependability of the splices.

The excellent results indicated have so far been obtained only with splicing units approximately of the form shown in FIG. 5. The preference for the form shown in FIG. 14 is therefore dependent upon tests confirming the belief that it will produce splices which can be shown by test to be just as good, or at least substantially so and safely satisfactory. Likewise, the acceptability of the sleeveless form of splicing unit of FIGS. 11–13 is at present dependent on the ability of the resulting splices to pass adequate tests such as have been passed by the form of FIGS. 1 to 10.

What is claimed is:

1. A tool for clipping, stripping and splicing wires having a handle by which the tool may be carried in one hand, and first and second actuating levers arranged for actuation by said hand;

said tool having a clipping and stripping unit, adapted to receive a plurality of wires, clip them to desired length with even ends, and strip them, and having a cavity for receiving a splicing unit into which the stripped and clipped wires are to be fed;

retention jaws operable by the first lever to close upon the inserted splicing unit for retaining the same, without obstructing the insertion of wires into the splicing unit;

latch means for holding the retention jaws in actuated position;

said clipping and stripping unit including clamping means, clipping means and piercing means operable by a laterally movable section actuated by the first lever to grip and clip wires which have been inserted in the clipping and stripping unit, and to penetrate the insulation at an appropriate distance from the clipped ends for the desired stripping, and means operable by further actuation of the first lever for separating the clamping means and the piercing means longitudinally of the wires to strip the end portions of the wires;

the total actuation of the first lever causing the clamping means to open to release the wires, and effectuating the latch to hold the retention jaws in retaining position;

a plunger shiftably carried by the tool and actuated by the second lever for movement into the space occupied by the splicing unit for producing a cold-flow coining thereof about the wires after the clipped and stripped wires have been inserted into the splicing unit for forming a permanent splice of said wires with substantially zero splice resistance;

and means actuated by the second lever at the end of the stroke for releasing the latch means, whereby absorption of the splicing stroke and removal of an inadequately formed splice is impossible.

2. A tool for clipping, stripping and splicing wires having a handle by which the tool may be carried in one hand, and first and second actuating levers arranged for actuation by said hand;

said tool having a clipping and stripping unit, adapted to receive a plurality of wires, clip them to desired length and strip them, and having a cavity for receiving a splicing unit into which the stripped and clipped wires are to be fed;

retention jaws operable by the first lever to close upon the inserted splicing unit for retaining the same, without obstructing the insertion of wires into the splicing unit;

latch means for holding the retention jaws in actuated position;

said clipping and stripping unit including clamping means, clipping means and piercing means operable by a laterally movable section actuated by the first lever to grip and clip wires which have been inserted in the clipping and stripping unit, and penetrate the insulation at an appropriate distance from the clipped ends for the desired stripping, and means operable by further actuation of the first lever for separating the clamping means and the piercing means longitudinally of the wires to strip the end portions of the wires;

the total actuation of the first lever causing the clamping means to open to release the wires, and effectuating the latch to hold the retention jaws in retaining position;

a plunger shiftably carried by the tool and actuated by the second lever for movement into the space occupied by the splicing unit for producing a cold-flow coining thereof about the wires after the clipped and stripped wires have been inserted into the splicing unit, for forming a permanent splice of said wires with substantially zero splice resistance;

and means actuated by the second lever at the end of the stroke for releasing the latch means, whereby abortion of the splicing stroke and removal of an inadequately formed splice is impossible; said cavity being adapted to receive a metal sleeve having a core within it, providing a wire-receiving passage therein, and an insulating pod extending beyond the sleeve in both directions.

3. A tool for clipping, stripping and splicing wires having a handle by which the tool may be carried in one hand, and first and second actuating levers arranged for actuation by said hand;

said tool having a clipping and stripping unit, adapted to receive a plurality of wires, clip them to a desired length and strip them, and having a cavity for receiving a splicing unit into which the stripped and clipped wires are to be inserted;

retention jaws operable by the first lever to close against the end of the inserted splicing unit for retaining the same, without obstructing the insertion of wires into the splicing unit;

latch means for holding the retention jaws in actuated position;

said clipping and stripping unit including clamping means, clipping means and piercing means operated by a laterally movable section actuated by the first lever to grip and clip wires which have been inserted in the clipping and stripping unit, and penetrate the insulation at an appropriate distance from the clipped ends for the desired stripping, and means operable by further actuation of the first lever for separating the clamping means and the piercing means longitudinally of the wires to strip the end portions of the wires;

the total actuation of the first lever causing the clamping means to open to release the wires, but effectuating the latch to hold the retention jaws in retaining position;

a plunger shiftably carried by the tool and actuated by the second lever for movement into the space occupied by the splicing unit for producing a cold-flow coining thereof about the wires after assuming the clipped and stripped wires have been inserted into the splicing unit, for forming a permanent splice of said wires with substantially zero splice resistance;

and means actuated by the second lever at the end of the stroke for releasing the latch means, whereby abortion of the splicing stroke and removal of an inadequately formed splicing unit therefrom is impossible, said cavity having walls separable from one another and forming a die for closely confining a core-like element to be cold-flowed to form the splices.

4. A stripping tool including a gauging slot which will receive fine wires to a greater depth than coarse wires, and insulation cutting means aligned with the gauge means at both depths, that at the greater depth, when actuated, having a smaller wire-clearance gap than the other.

5. A tool for splicing wires having a handle by which the tool may be carried in one hand, and actuating means arranged for actuation by said hand;

said tool having a cavity for receiving a splicing unit into which wires are to be fed;

retention means operable to close upon the outside of the inserted splicing unit for retaining the same, without obstructing the insertion of wires into the splicing unit;

latch means for holding the retention jaws in actuated position;

a plunger shiftably carried by the tool and actuated by the actuation means for movement into the space occupied by the splicing unit for producing a cold-flow coining thereof about wires which have been inserted into the splicing unit for forming a permanent splice of said wires with substantially zero splice resistance;

and means actuated at the end of the plunger stroke for releasing the latch means, whereby abortion of the splicing stroke and removal of an incompletely coined splicing unit therefrom is impossible.

6. A tool for splicing wires having a handle by which the tool may be carried in one hand, and means arranged for actuation by said hand;

said tool having a cavity for receiving a splicing unit into which wires are to be fed;

retention means operable to close upon the outside of the inserted splicing unit for retaining the same, without obstructing the insertion of wires into the splicing unit;

a plunger shiftably carried by the tool and acutated by the actuation means for movement into the space occupied by the splicing unit for producing a cold-flow coining thereof about wires which have been inserted into the splicing unit for forming a permanent splice of said wires with substantially zero splice resistance;

and means actuated at the end of the plunger stroke for releasing the retention means.

7. Apparatus for clipping, stripping and splicing wires having a clipping and stripping unit adapted to receive a plurality of wires, clip them to a desired length, and strip them, and having means forming a cavity for receiving a splicing unit into which wires are to be inserted, means to retain the splicing unit in the cavity;

said clipping and stripping unit including clamping means, clipping means and piercing means operated by a laterally movable section to grip and clip wires which have been inserted in the clipping and stripping unit, and penetrate the insulation at an appropriate distance from the clipped ends for the desired stripping, and means operable for separating the clamping means and the piercing means longitudinally of the wires to strip the end portions of the wires;

the total actuation of the last named means causing the jaws to open to release the wires;

a plunger shiftably carried by the tool and means for actuating the plunger with progressively increasing mechanical advantage into the space occupied by the splicing unit for producing a cold-flow coining thereof about wires which have been inserted into the splicing unit for forming a permanent splice of said wires with substantially zero splice resistance.

8. Apparatus for clipping, stripping and splicing wires having a clipping and stripping unit adapted to receive a plurality of wires, clip them to a desired length, and strip them, and having means forming a cavity for receiving a splicing unit into which wires are to be inserted, means to retain the splicing unit in the cavity;

said clipping and stripping unit including clamping means, clipping means and piercing means operated by a laterally movable section to grip and clip wires which have been inserted in the clipping and stripping unit, and penetrate the insulation at an appropriate distance from the clipped ends for the desired stripping, and means operable for separating the clamping means and the piercing means longitudinally of the wires to strip the end portions of the wires;

the total actuation of the last named means causing the jaws to open to release the wires;

a plunger shiftably carried by the tool and means for actuating the plunger into the space occupied by the splicing unit for producing a cold-flow coining thereof about wires which have been inserted into the splicing unit for forming a permanent splice of said wires with substantially zero splice resistance.

9. A stripping tool including a gauging slot which will receive fine wires to a greater depth than coarse wires, and insulation cutting means aligned with the gauge means at both depths, that at the greater depth, when actuated, having a smaller wire-clearance gap than the other; the insulation cutting means at both locations being formed in common in a pair of notched plates closing edgewise upon one another, the notches in the deeper location being smaller than the others.

10. A tool for cutting insulation on a wire including a pair of relatively movable plates lying in a common plane, at least one of said plates having sharpened notches, means for moving one of the plates endwise against the other and yieldable means to limit the contact force between the plates; the notches being sized to cut insulation of a given wire size without damaging the wire.

11. Apparatus for clipping, stripping and splicing wires having a clipping and stripping unit adapted to receive a plurality of wires, clip them to a desired length, and strip them, and having means forming a cavity for receiving a splicing unit into which wires are to be inserted, means to retain the splicing unit in the cavity;

said clipping and stripping unit including clamping means, clipping means and piercing means operated by a laterally movable section to grip and clip wires which have been inserted in the clipping and stripping unit, and penetrate the insulation at an appropriate distance from the clipped ends for the desired stripping, and means operable for separating the clamping means and the piercing means longitudinally of the wires to strip the end portions of the wires;

a plunger shiftably carried by the tool and means for actuating the plunger into the space occupied by the splicing unit for producing a cold-flow coining thereof about wires which have been inserted into the splicing unit for forming a permanent splice of said wires with substantially zero splice resistance.

12. A tool for clipping, stripping and splicing wires having a handle by which the tool may be carried in one hand, and first and second actuating levers arranged for actuation by said hand;

said tool having a clipping and stripping unit operated by the first lever, adapted to receive a plurality of wires, clip them to desired length with even ends, and strip them, and having a cavity for receiving a splicing unit into which the stripped and clipped wires are to be fed;

retention jaws operable by the first lever to close upon the inserted splicing unit for retaining the same, without obstructing the insertion of wires into the splicing unit;

latch means for holding the retention jaws in actuated position;

a plunger shiftably carried by the tool and actuated by the second lever for movement into the space occupied by the splicing unit for producing a cold-flow coining thereof about the wires after the clipped and stripped wires have been inserted into the splicing unit for forming a permanent splice of said wires with substantially zero splice resistance;

and means actuated by the second lever at the end of the stroke for releasing the latch means, whereby abortion of the splicing stroke and removal of an inadequately formed splice is impossible.

13. A tool for clipping, stripping and splicing wires having a handle by which the tool may be carried in one hand, and first and second actuating levers arranged for actuation by said hand;

said tool having a unit operated by the first lever, adapted to receive a plurality of wires, clip them to desired length with even ends, and weaken their insulation at a predetermined distance from their ends for stripping, and having a cavity for receiving a splicing unit into which the stripped and clipped wires are to be fed;

retention jaws operable by the first lever to close upon the inserted splicing unit for retaining the same, without obstructing the insertion of wires into the splicing unit;

latch means for holding the retention jaws in actuated position;

a plunger shiftably carried by the tool and actuated by the second lever for movement into the space occupied by the splicing unit for producing a cold-flow coining thereof about the wires after the clipped and stripped wires have been inserted into the splicing unit for forming a permanent splice of said wires with substantially zero splice resistance;

and means actuated by the second lever at the end of the stroke for releasing the latch means, whereby abortion of the splicing stroke and removal of an inadequately formed splice is impossible.

14. A tool for clipping, stripping and splicing wires having a handle by which the tool may be carried in one hand;

said tool having a unit adapted to receive a plurality of wires, clip them to desired length with even ends, and weaken their insulation at a predetermined distance from their ends for stripping, and having a cavity for receiving a splicing unit into which the stripped and clipped wires are to be fed;

retention jaws operable to close upon the inserted splicing unit for retaining the same, without obstructing the insertion of wires into the splicing unit;

latch means for holding the retention jaws in actuated position;

a plunger shiftably carried by the tool and actuated for movement into the space occupied by the splicing unit for producing a cold-flow coining thereof about the wires after the clipped and stripped wires have been inserted into the splicing unit for forming a permanent splice of said wires with substantially zero splice resistance;

and means actuated at the end of the plunger stroke for releasing the latch means, whereby abortion of the splicing stroke and removal of an inadequately formed splice is impossible.

15. A tool for clipping, stripping and splicing wires having a handle by which the tool may be carried in one hand, and first and second actuating levers arranged for actuation by said hand;

said tool having a clipping and stripping unit, adapted to receive a plurality of wires, clip them to desired length with even ends, and strip them, and having a cavity for receiving a splicing unit into which the the stripped and clipped wires are to be fed;

retention jaws operable by the first lever to close upon the inserted splicing unit for retaining the same, without obstructing the insertion of wires into the splicing unit;

latch means for holding the retention jaws in actuated position;

said clipping and stripping unit including clamping means, clipping means and piercing means operable by a laterally movable section actuated by the first lever to grip and clip wires which have been inserted in the clipping and stripping unit, and to penetrate the insulation at an appropriate distance from the clipped ends for the desired stripping, and means operable by further actuation of the first lever for separating the clamping means and the piercing means longitudinally of the wires to strip the end portions of the wires;

the total actuation of the first lever causing the clamping means to open to release the wires, and effectuating the latch to hold the retention jaws in retaining position;

a plunger shiftably carried by the tool and actuated by the second lever for applying the splicing unit to the wires after the clipped and stripped wires have been inserted into the splicing unit;

and means actuated by the second lever at the end of the stroke for releasing the latch means, whereby abortion of the splicing stroke and removal of an inadequately formed splice is impossible.

16. A tool for clipping, stripping and splicing wires having a handle by which the tool may be carried in one hand;

said tool having a clipping and stripping unit, adapted to receive a plurality of wires, clip them to desired length with even ends, and strip them, and having a cavity for receiving the stripped and clipped wires;

said clipping and stripping unit including clamping means, clipping means and piercing means operable by a laterally movable section to grip and clip wires which have been inserted in the clipping and stripping unit, and to penetrate the insulation at an appropriate distance from the clipped ends for the desired stripping, and means for separating the clamping means and the piercing means longitudinally of the wires to strip the end portions of the wires;

said tool including means for forming a splice after the clipped and stripped wires have been inserted into said means.

17. A tool for clipping, stripping and splicing wires having a handle by which the tool may be carried in one hand;

said tool having a clipping and stripping unit, adapted to receive a plurality of wires, clip them to desired length with even ends, and strip them, and having a cavity for receiving the stripped and clipped wires;

said clipping and stripping unit including clamping means, clipping means and piercing means operable by a laterally movable section to grip and clip wires which have been inserted in the clipping and stripping unit, and to penetrate the insulation at an appropriate distance from the clipped ends for the desired stripping, and means for separating the clamping means and the piercing means longitudinally of the wires to strip the end portions of the wires;

said tool including means for forming a splice after the clipped and stripped wires have been inserted into said means;

said clipping and stripping unit including an open-ended stepped gauging slot for receiving the wire by motion laterally of the wires and limiting the lateral penetration of a heavier wire to less than that of a finer wire, and having its piercing means differentially constructed to provide the proper penetration of piercing wires at each depth of penetration, and said means for forming a splice being suitable for splicing together two wires of different sizes.

18. A tool for clipping, stripping and splicing wires having a handle by which the tool may be carried in one hand;

said tool having a clipping and stripping unit, adapted to receive a plurality of wires, clip them to desired length with even ends, and strip them, and having a cavity for receiving the stripped and clipped wires;

said clipping and stripping unit including clamping means, clipping means and piercing means operable by a laterally movable section to grip and clip wires which have been inserted in the clipping and stripping unit, and to penetrate the insulation at an appropriate distance from the clipped ends for the desired stripping, and means for separating the clamping means and the piercing means longitudinally of the wires to strip the end portions of the wires;

said tool including means for forming a splice after the clipped and stripped wires have been inserted into said means;

said clipping and stripping unit including an open-ended stepped gauging slot for receiving the wire by motion laterally of the wires and limiting the lateral penetration of a heavier wire to less than that of a finer wire, and having its piercing means differentially constructed to provide the proper penetration of piercing wires at each depth of penetration.

19. A tool for clipping, stripping and splicing wires having a handle by which the tool may be carried in one hand;

said tol having a clipping and stripping unit, adapted to receive a plurality of wires, clip them to desired length with even ends, and strip them, and having a cavity for receiving the stripped and clipped wires;

said tool having a clipping and stripping unit, adapted means, clipping means and piercing means operable by a laterally movable section to grip and clip wires which have been inserted in the clipping and stripping unit, and to penetrate the insulation at an appropriate distance from the clipped ends for the desired stripping, and means for separating the clamping means and the piercing means longitudinally of the wires to strip the end portions of the wires;

said tool including means for forming a splice after the clipped and stripped wires have been inserted into said means;

said means for forming a splice having a cavity for receiving an insulating pod longer than the length to which said tool strips the wires, and including means for forming the splice within said pod.

20. A tool for clipping, stripping and splicing wires;

said tool having a clipping and stripping unit, adapted to receive a plurality of wires, clip them to desired length with even ends, and strip a predetermined length of each wire, and having a cylindrical cavity for receiving a splicing unit comprising a sleeve and a core in the sleeve into which the stripped and clipped wires are to be fed;

retention jaws operable in conjunction with the operation of said unit to close upon one end of the inserted splicing unit for retaining the same, without obstructing the insertion of wires into the splicing unit through said end;

a plunger shiftably carried by the tool to move axially into the sleeve from the other end, and means for moving it forcefully into the sleeve and into the space occupied by the core for producing a cold-flow coining thereof about the wires, after the clipped and stripped wires have been inserted into the splicing unit, for forming a permanent splice of said wires with substantially zero splice resistance.

21. A splicing tool including means forming a cylindrical cavity for receiving a splicing element comprising a sleeve and a core in the sleeve having an elongated passage therein aligned with a tool aperture to receive wires to be spliced when inserted in one direction; a plunger carried by the tool to move axially into the cavity in the opposite direction and of a smaller diameter than the cavity to slide within the sleeve, and means for moving the plunger forcefully into the sleeve, means to block movement of the core by the plunger while it is confined laterally by the sleeve in the cavity, whereby the movement of the plunger will produce cold-flow coining of the core about the wires inserted therein to form a permanent splice of substantially zero splice resistance.

22. A splicing tool including means forming a cavity for receiving a splicing element having an elongated passage therein adapted to receive wires axially to be spliced; said element when in said cavity in its intended arrangement being confined radially in all directions about the axis; a plunger carried by the tool, and means for moving the plunger along said axis to produce cold-flow coining of the element about the wires inserted therein to form a permanent splice of substantially zero splice resistance.

23. A splicing tool including means forming a cavity for receiving a splicing element having an elongated passage therein adapted to receive wires axially to be spliced; said element when in said cavity in its intended arrangement being confined radially in all directions about the axis; a plunger carried by the tool, and means for moving the plunger along said axis to produce cold-flow coining of the element about the wires inserted therein to form a permanent splice of substantially zero splice resistance; and retaining means for holding the splicing element in the cavity for preventing removal of the splice unless the plunger has moved through a predetermined stroke.

24. A tool for splicing wires including a unit for stripping insulation from the wires to be spliced, and means for cold-flow coining a slug of metal with the wires therein, including a plunger movable in a direction lengthwise of the wires and means confining the slug to force the metal while in a cold-flowing state into intimate contact with the wires.

25. A tool for splicing wires including a unit for stripping insulation from the wires to be spliced, and means for cold-flow coining a slug of metal with the wires therein, all operable by one hand, said means including a plunger movable in a direction lengthwise of the wires and means confining the slug to force the metal while in a cold-flowing state into intimate contact with the wires.

26. A tool for splicing wires including a unit for stripping insulation from the wires to be spliced, and means for cold-flow coining a slug of metal with the wires therein, including a plunger movable in a direction lengthwise of the wires and means confining the slug to force the metal while in a cold-flowing state into intimate contact with the wires; and including means to lock the confining means in place to prevent removal of the slug until said plunger has been operated through a predetermined stroke.

27. A tool for splicing wires including a unit for stripping insulation from the wires to be spliced, and means for cold-flow coining a slug of metal with the wires therein, all operable by one hand, said means including a plunger movable in a direction lengthwise of the wires and means confining the slug to force the metal while in a cold-flowing state into intimate contact with the wires; and including means to lock the confining means in place to prevent removal of the slug until said plunger has been operated through a predetermined stroke.

References Cited
UNITED STATES PATENTS

| | | | |
|---|---|---|---|
| 1,456,928 | 5/1923 | Lake | 81—9.5 |
| 2,784,621 | 3/1957 | Klinger | 7—5.5 |

RICHARD H. EANES, Jr., *Primary Examiner.*

UNITED STATES PATENT OFFICE
CERTIFICATE OF CORRECTION

Patent No. 3,350,761                          November 7, 1967

Eugene H. Souter

It is certified that error appears in the above identified patent and that said Letters Patent are hereby corrected as shown below:

Column 1, line 39, "provided to be "open," or to" should read -- proved to be "open," or to have too --. Column 4, line 35, "kinds" should read -- kinks --. Column 5, line 38, "occassion" should read -- occasion --. Column 9, line 3, "absortion" should read -- abortion --. Column 14, line 47, "tol" should read -- tool --. Column 14, lines 51 and 52, "said tool having a clipping and stripping unit, adapted means" should read -- said clipping and stripping unit including clamping means --.

Signed and sealed this 30th day of December 1969.

(SEAL)

Attest:

Edward M. Fletcher, Jr.                       WILLIAM E. SCHUYLER, JR.

Attesting Officer                               Commissioner of Patents